Patented Mar. 12, 1946

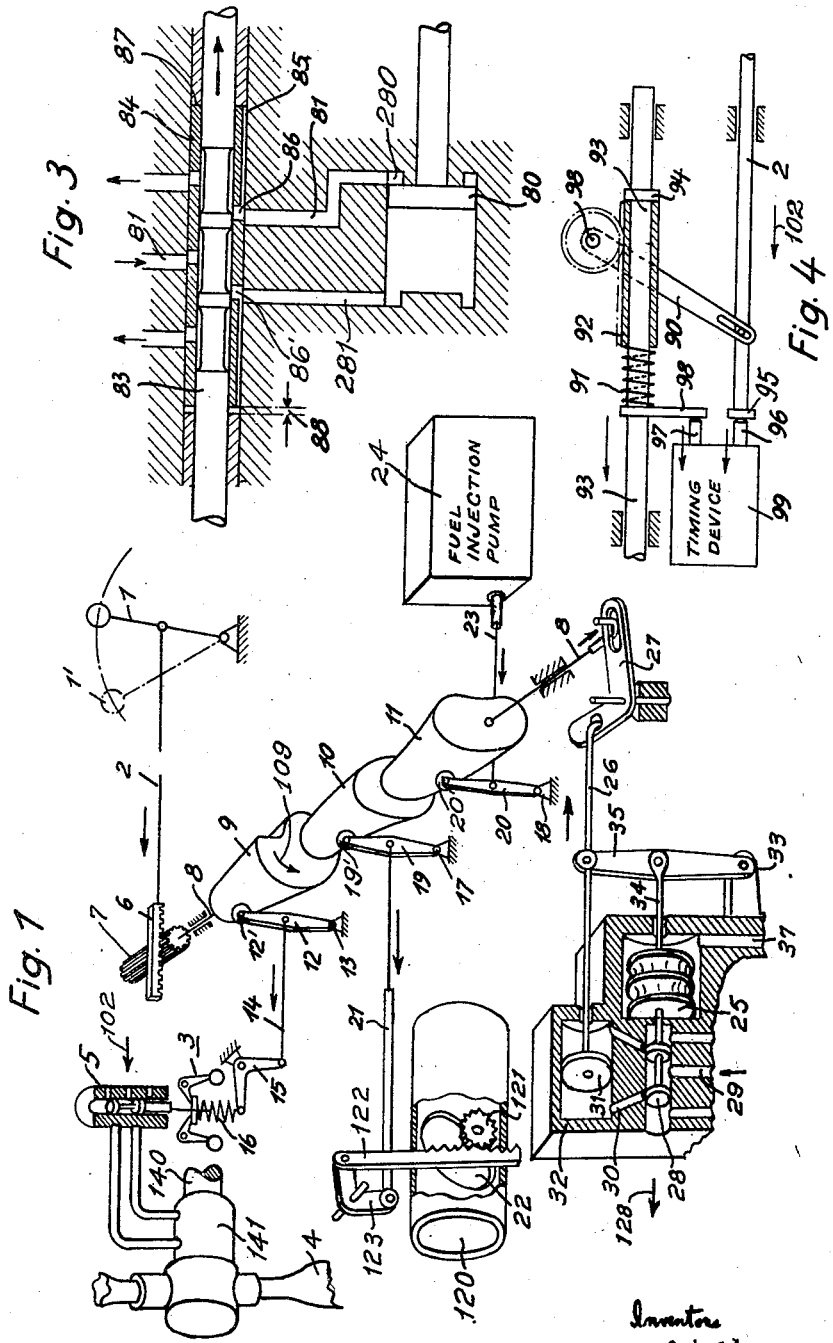

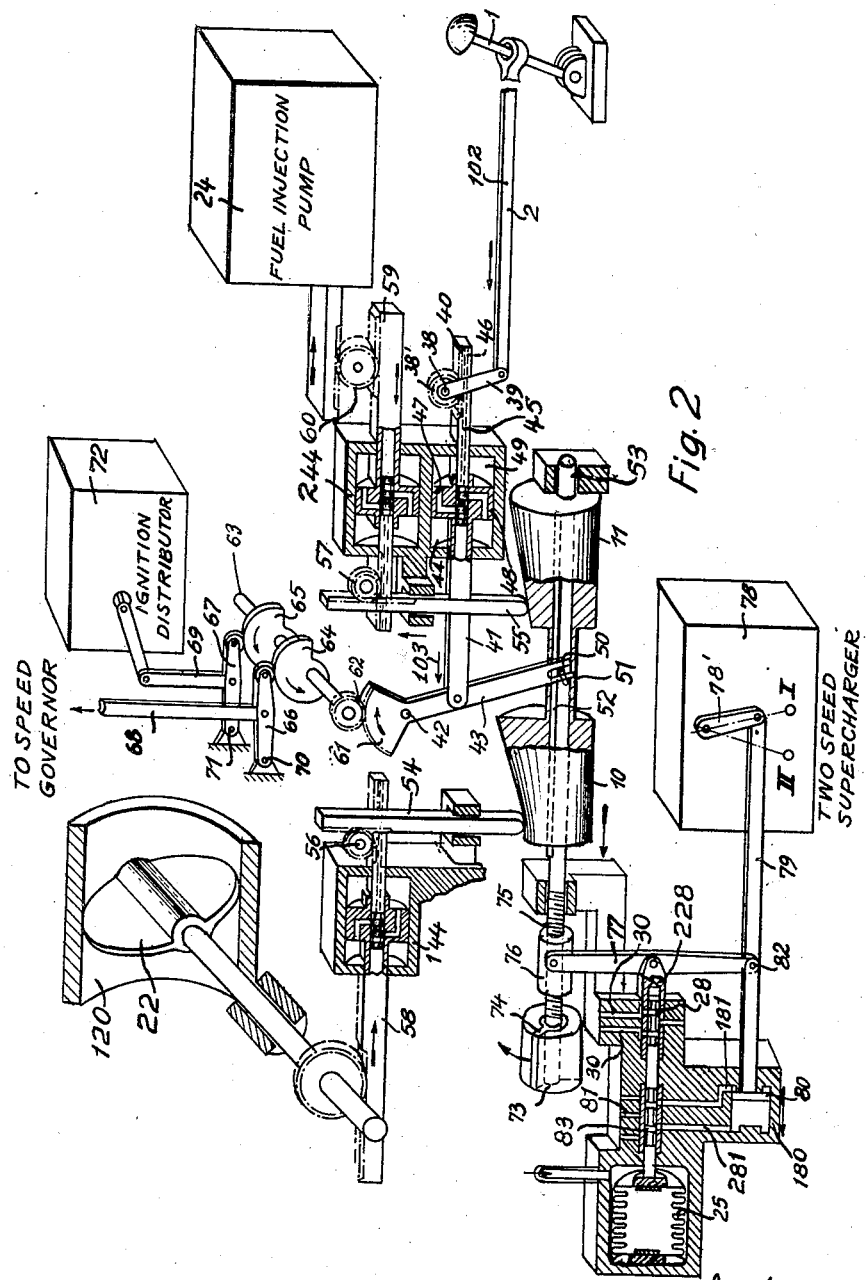

2,396,618

UNITED STATES PATENT OFFICE 2,396,618

ARRANGEMENT FOR CONTROLLING THE POWER OF INTERNAL-COMBUSTION ENGINES

Albert Stieglitz, Berlin-Spandau, and Berthold Gärtner, Berlin-Wilmersdorf, Germany; vested in the Alien Property Custodian Application June 29, 1939, Serial No. 281,826
In Germany July 1, 1938

8 Claims. (Cl. 170—135.6)

This invention relates to a device for controlling the power of internal combustion engines, and more particularly the power plant of aircraft, in which one or more regulating devices are manually controlled through a transmission system including control cams. In the known regulating devices of this type, the control characteristic of the devices to be regulated, such as the throttle, mixture regulator, fuel injection pump, speed governor, etc., relative to the adjustment of the hand-operated control is fixed for each altitude by the control curve of the cam mechanism. As a result, those devices do not permit varying at will at any given altitude or at any power output the position of the throttle or the mixture control, for instance, since the adjustment of these devices is already fixed in a given sense by the control cams.

The main object of the invention is to eliminate the above-mentioned drawback.

According to the invention the cam mechanism for transmitting the control movement from the manually-operated actuating member to the regulating devices of the power plant is so designed that it allows laterally displacing the cams and the cooperating follower members relatively to each other, and the cams are provided with an operative cam surface extending in the direction of the displacement so that such displacement has the effect of varying the control characteristic of the transmission mechanism.

The relative displacement of the cams and their followers may be effected in accordance with the altitude, for instance automatically through an altimeter, such as a barometric impulse transmitting device, or through a hand-operated lever, it being, of course, also possible to provide for an automatic displacement by an altimetric device, as well as an additional manual adjustment of setting of the automatic mechanism by manual means.

The invention renders it possible to effect an accurate control of aircraft power plants while maintaining the individual regulating devices of the power plant in permanent mechanical connection with the hand-operated control and avoiding complicated transmission means and regulating devices heretofore employed. Despite the possibility of varying the control characteristics of the individual regulating operations at different heights of flight, the arrangement according to the invention may be so designed as to permit the pilot a positive and constrained control of the plant, for instance an adjustment at will of the fuel consumption for a given altitude and power output.

In the drawings:

Fig. 1 is a diagrammatic, perspective view of an embodiment of the invention applied to a speed-controlled aero-engine operating with direct fuel injection.

Fig. 2 is a similar view of another embodiment of the invention.

Fig. 3 is an enlarged sectional view of a detail of the device of Fig. 2.

Fig. 4 is a part-sectional view of a modified detail of the devices of Figs. 1 and 2.

Dealing at first with Fig. 1, 4 denotes the variable-pitch propeller of an aircraft, 140 the propeller shaft operated by an internal combustion engine (not shown), and 141 a hydraulic device for varying the pitch adjustment of the propeller. This device is controlled by a slide valve 5 which is connected with a speed governor 3. The speed governor has a spring 16 connected through a bell-crank lever 15 and a connecting rod 14 with a control lever 12 which is pivoted at 13 and serves to adjust the tension of spring 16 in order to set or vary the datum value of the propeller speed to be kept constant by the governor and the pitch-regulating device controlled thereby.

The intake conduit leading to the manifold of the aero-engine is indicated by 120, and the throttle valve for controlling the charge of the engine by 22. A suitable transmission, represented by a pinion 121, a rack 122, and a bell crank 123, serves to connect the throttle through a rod 21 with a second control lever 19 pivoted at 17.

The power plant further includes a fuel injection pump 24 which is controlled through a connecting rod 23 by a third control lever 20 pivoted at 18.

The three control levers 12, 19 and 20 and therewith the speed-regulating device, the throttle and the fuel injection pump are operated with a given control characteristic and in a given dependence upon one another by means of a single hand-operated actuating member represented by control lever 1. This lever is connected through a rod 2 and a transmission gear, represented by a rack 6 and a pinion 7, with a cam shaft 8. The shaft is provided with three cams 9, 10 and 11 for adjusting the aforedescribed three regulating devices 3, 22 and 24 respectively. Each of the three control levers 12, 19 and 20 is provided with a roller 12', 19' and 20' respectively, which engages the cam surface of the appertaining cam member. The shaft 8 is displaceable in its axial direction, and the three cams 9, 10 and 11 consist of cylindrical bodies of sufficient axial length to permit such displacements. The cam curves of the cylinders change in rotary as well as in axial direction.

The arrangement described thus far operates as follows.

If the power of the engine is to be varied, the manual control 1 is shifted, for instance into the position 1' indicated by dot and dash lines. Rod 2 moves in the direction of arrow 102, and the shaft 8 with its cams 9, 10 and 11 rotates as indicated by arrow 109, thereby moving the rods 14, 21 and 23 in the directions also indicated by arrows. As a result, rod 14 causes the spring 16 to be stretched so that the datum value of the governor 3 is varied in a manner so that the speed of the engine and therefore the propeller pitch is varied, or that upon an increase of the speed the pitch remains temporarily constant. At the same time, the control cam 10 varies the adjustment of the throttle 22, and the control cam 11 varies the amount of delivery of the fuel injection pump. These two operations which are performed through the two control cams 10 and 11 may be combined if a carburetor engine is employed. In such a case it is further possible to adjust the mixture regulator without the use of barometric measuring gauges directly from a further control cam, for instance from the now vacant control cam 11. Furthermore, if it is desirable, in the case of mixtures ignited by spark plugs, to shift also the moment of ignition when actuating the hand-operated lever, a further control cam may be provided which adjusts, for instance, the ignition distributor.

Consequently, by displacing the hand-operated lever 1 into the position 1', a change in the position of the governor 3 in the position of the throttle 22 and in the amount of delivery of the fuel injection pump 24 is brought about, thus resulting in an increase in the engine power. Now the pitch of the propeller is automatically adjusted in accordance with the new datum value of the governor 3 to the increase of the engine power, provided the altitude is not varied. If the altitude is changed, the speed governor 3 varies the propeller pitch automatically so that the speed remains constant. Such a change in altitude, however, requires other adjusting conditions for the regulating members, in this case the throttle 22 and the fuel injection pump 24. That is, upon an increase in altitude the throttle 22 should be opened because of the smaller air density, whereas the fuel quantity delivered by the injection pump should be reduced in order to permit an economic operation of the engine with a poor mixture. The present invention permits these circumstances to be taken into consideration, and to this end provides the following adjusting means.

As shown in Fig. 1, a barometric impulse-transmitting device is connected through a rod 26 and a bell-crank lever 27 with the cam shaft 8. Consequently, by moving the rod 26 in the direction indicated by an arrow the shaft 8 and its cams 9, 10 and 11 are axially shifted so that the control of speed, mixture, and fuel injection is varied simultaneously and in a given relation to one another in dependence upon the altitude. The arrangement may be so designed that the shaft 8 or the lever 27 can be displaced by hand in order to maintain the additional control operative even if the barometric device fails to operate.

The barometric impulse transmitter shown in Fig. 1 is constructed as follows. A barometric bellows 25 is arranged in a chamber 36 which communicates with the outside atmosphere through a duct 37. The bellows is connected with a control piston 28, to whose central portion oil is supplied under pressure through a supply duct 29.

A main cylinder 32 containing a main piston 31 is connected by ducts 30 and 30' with the cylinder of the control piston 28. In the neutral position illustrated, both pistons 28 and 31 are in central position and both ducts 30 and 30' are closed by piston 28. If the height of flight changes for instance from 2000 m. to 2500 m., the control piston 28 is displaced owing to the expansion of the measuring gauge 25 in the direction indicated by the arrow 128. The left chamber of cylinder 32 is now supplied with oil through duct 30 so that the piston 31 moves to the right-hand side and displaces through the rod 26 the shaft 8. At the same time, preferably through the same rod 26, a further lever 35 is actuated. This lever is rotatably mounted, as indicated at 33, and connected to the measuring gauge 25 as indicated at 34. The purpose of the lever 35 is to displace, after a complete control operation, the measuring gauge 25 and the control piston 28 in the opposite direction until the ducts 30 and 30' are closed so that the piston 31 comes to rest. The device may be so arranged that the barometric measuring gauge 25 in chamber 36, i. e. the passage 37, is also exposed to the impact pressure. It is further possible to expose the measuring gauge to the outside temperature. Hence, all these factors may be considered when the shaft 8 is displaced in order to obtain the most favorable total motor adjustment.

In the embodiment shown in Fig. 2, the control cams, in contradistinction to the embodiment shown in Fig. 1, are displaced in the axial direction when actuating the hand-operated main control and rotated by an altimetric device.

In Fig. 2, 22 is the throttle valve of a supercharger (not shown), 68 is a transmission rod leading to a pitch-controlling speed governor for varying its datum value, and 24 a fuel injection pump. A manual control lever 1 and a rod 2 linked thereto serve to adjust the four regulating devices 22, 24, 68 and 72 in a given relation to one another. 25 is a barometric gauge for automatically superposing an altitude-responsive control.

Rod 2 is connected through a lever 39 with a pinion 38 rotatable about the stationary axis 38'. Pinion 38 meshes with a rack 40 whose movement is transmitted through a pusher rod 41 to a lever 43 pivotally mounted as indicated at 42. In the embodiment shown, a hydraulic power amplifier 44 is so arranged that the gear 38' displaces first a control piston 45 provided with the gear rack 40. Oil or the like is supplied under pressure through an axial bore 46 to the control piston 45 whence it may reach the passage 47. When rod 2 is shifted in the direction of the arrow 102, the control piston 45 moves to the left and oil is supplied through the duct 47 to the right-hand chamber 49 of the working piston so that the working piston 48 displaces the push rod 41 in the direction of the arrow 103 until the passage 47 is again covered by the control piston 45.

The lever 43 forms the actuating member of two cam mechanisms. One of these cam mechanisms comprises a cam shaft 63 with two cams 64 and 65, and is geared with lever 43 by means of a pinion 62 on shaft 63 and a gear 61 integral with lever 43. Cam 64 cooperates with a follower comprising a lever 66 pivoted at 70 and a roller which is mounted on lever 66 and held against the cam surface of cam 64. Lever 66 is linked to rod 68 for controlling the speed governor. Similarly, cam 65 cooperates with a lever 67 pivoted at 71, which is linked to a member 69 for controlling the ignition distributor 72. The second cam mechanism coupled with lever 43 has two control cams 110 and 111 slidably but non-rotatably mounted on a shaft 53 by means of a spline 52. An intermediate tubular part 51 connects both cams 110 and 111 and is coupled with the forked end of lever 43 by means of a coupling pin 50. Cam 110 cooperates with a tappet 54 connected with the throttle valve 22 through a gear 56, a power amplifier 144 and a rack 58. Cam 111 actuates a tappet 55 which is connected with the fuel injection pump 24 through a gear 57, another hydraulic power amplifier 244, a rack 59, and a gear 60. The power amplifiers 144 and 244 are similar to the above-described amplifier 44. Also in this case it is possible, as in the embodiment of Fig. 1, to combine, if desired, the two adjustments effected by cams 110 and 111 if an engine, provided with a carburetor, is employed.

Upon the displacement of the rod 2 in the direction of the arrow 102 by the hand-operated lever 1, the position of the two control cams 110 and 111 is first changed through the hydraulic power amplifier 44. As a result, the positions of the throttle 22 and the quantity of the fuel supplied by pump 24 are varied through the power amplifiers 144 and 244. At the same time also the gear 62 and the shaft 63 with its cams 64 and 65 are rotated in the direction indicated by arrows so that the datum value of the speed governor and the adjustment of the ignition distributor 72 are also varied.

As in the case of the embodiment of Fig. 1, the invention provides means for superposing on the above-mentioned manual control a corrective or modifying regulation in response to changes in altitude. These means, shown in Fig. 2, are constructed as follows. The barometric bellows 25 is connected with the piston 28 of a sleeve valve for controlling a hydraulic motor 73 having a rotary piston 74 firmly secured to the shaft 53. By uncovering one or the other of the ducts 30 and 30', the piston 28 and the sleeve 228 of the valve regulate the supply of pressure fluid to the motor 73 and thus cause the motor to rotate in one or the other direction. In the position illustrated, both ducts 30 and 30' are closed by piston 28 so that the motor 73 and the shaft 53 are at rest. The sleeve 228 is connected with a lever 77, one end of which is linked to a nut 76 seated on a threaded portion 75 of the shaft 53. The other end of lever 77 is fulcrumed at 82.

Any change in altitude effects an expansion or contraction of the bellows 25 and hence a control movement of the piston 28 which causes the hydraulic motor to turn the shaft 53 and the cams 110 and 111 so that the adjustment of the regulating devices 22 and 24 is varied in accordance with the peripheral curve shape of the cams. Thus, at a gain in altitude, for instance, the throttle is opened and the fuel quantity supplied by pump 24 is reduced or, as the case may be, adapted to the decreased supercharger pressure. The rotation of shaft 53 effects a displacement of nut 76 and a corresponding movement of lever 77. As a result, the valve sleeve 228 is displaced relatively to the valve piston 28 and finally closes the channels 30 and 30' so that the shaft 53 and its cams 110 and 111 remain in the proper position corresponding to the height of flight.

Since it is desirable, when employing a supercharger, to impart to the driving gear of the supercharger a different speed at different heights, the supercharger gear 78 is preferably also connected with the regulating arrangement so as to be automatically controlled thereby. To this end, as exemplified in Fig. 2, the supercharger gear 78 is connected by a rod 79 with an operating piston 80 which is controlled by the piston 83 of a control valve governing the supply of pressure fluid from a supply duct 81 through intermediate ducts 181 and 281. The control piston 83 is connected with the altimetric device 25. The supercharger gear 78 is shown as having, for instance, two speed steps corresponding to the positions I and II of its regulating member 78'. In the position shown, the first speed is put in, and as soon as the control piston 83 moves to the right, the operating piston 80 moves in the direction of the arrow 180 and thus puts in the second speed step. If the supercharger is changed over at a given altitude from speed I to speed II, the adjusted values of the other regulating devices, for instance the position of the throttle and the adjustment of the fuel injection pump, do not correspond to the new speed of the supercharger. To bring about the proper adjustments of these other devices for the new speed of the supercharger, the pivot 82 of the lever 77 is preferably provided on the rod 79 so that the lever 77, through the adjusting nut 76 and the thread 75, which is preferably designed as a multiple thread, may rotate the shaft 53 and the control cams 10 and 11 a certain amount beyond the rotation performed through the barometric device, until supercharger pressure and fuel supply attain the desired value. Such a change-over of the supercharger gear may also be provided in the embodiment shown in Fig. 1, in the latter case by varying the axial displacement of the shaft 8 in accordance with the new speed of the supercharger.

If the supercharger gear employed is a step gear, it is preferable to effect the change-over suddenly and to provide between the individual change-over points such a great difference in altitude that at any given height a hunting of the change-over device is prevented. If, for instance, the supercharger gear is changed over at a height of 3000 m. to the next higher step, the change-over to the lower gear step is effected, for instance at a height of 2800 m. so that 200 m. are available for the difference of the change-over of the gear. Fig. 3 showing a detail of Fig. 2 serves to elucidate how such an overlapping of the change-over points is possible. In the illustrated position, the openings 86 and 86' of the sleeve 84 are somewhat displaced relatively to the ducts 181 and 281. When the piston moves in the direction of the arrow, the openings 86, 86' and the ducts 181, 281 are gradually uncovered so that oil is supplied under pressure from duct 81 through duct 181 to the cylinder space 280. The oil also passes through the channel 85 into the joint 87 between the sleeve 84 and the casing. The sleeve 84 is so mounted on the control piston as to be capable of freely moving a distance as indicated at 88. Therefore, the oil entering at 87 throws the sleeve to the left, and the sectional area of flow is thus restored by the displacement of the opening 86 over the supply passage 81. It is evident that upon a change in altitude, the control piston 83 must travel a predetermined distance within the sleeve 84 before the latter is displaced and the oil pressure in cylinder space 280 sufficiently increased to effect a changing over of the supercharger gear. This distance and the degree of the variation in the effective cross section of the valve openings are the deciding factors for the altitude range in which the speed of the supercharger is changed to a higher or lower step.

The above-described arrangements may be so designed that the motor delivers its maximum power during a predetermined period, for instance during the take-off. The time during which a motor may operate with maximum power is limited. Therefore, a timing device may be connected with the rod 2 of the hand-operated lever 1 in a manner so that after a certain time of increased power output the motor adjustment is varied so as to prevent a further overloading of the motor. In Fig. 4 is shown an embodiment of such type. In this figure, 2 is the rod for manually adjusting the regulating arrangement and 99 a timing device inserted between the rod 2 and a second rod 93 which is connected with the actuating element, such as rack 6 in Fig. 1 or lever 39 in Fig. 2, of the regulating arrangement. The rod 93 carries a sleeve 92 which is slidable relatively to the rod against the force of a spring 91 and whose movements relative to the rod are limited by stops 94 and 98. Rod 2 and sleeve 92 are coupled by means of an arm 90 rotatable about a stationary shaft 98. A displacement of rod 2 effects a displacement of sleeve 92 and rod 93 in the same direction. When rod 2 is moved in the direction of arrow 102, the normal power of the engine attains its limit as soon as the collar 95 of rod 2 comes into engagement with a movable stop 96 of the timing device 99. At the same time, the stop 98 of rod 93 comes into engagement with a second stop 97 of the timing device. The stops 96 and 97 are connected with the mechanism or clockwork of the timing device and form push-buttons for controlling the device, as is apparent from the following. If the engine is to deliver a greater power for a given period, the hand-operated rod 2 and therewith the rod 93 are forced against the push-button stops 96 and 97, thus releasing the timing device 99. As soon as the clockwork of the device has run down, it switches in a drive, not shown, which moves the extension 97 into its initial position. In this manner the rod 93 is displaced in the opposite direction against the force of the spring 91 without moving the sleeve 92, so that the engine attains automatically its normal adjustment after a predetermined time. The pilot cannot influence this operation so that the engine will not be overloaded for a considerable time. The just-mentioned displacement of the rod 93, for instance from the take-off position effected by the action of the timing device, may be signaled to the pilot if desired. It is also possible to couple a recording device with the clockwork in such a manner that it indicates how often the engine has been run at maximum power, for instance in order to permit a judgment of the wear and tear of the engine or the like.

While in the embodiments shown control cams of gradually changing curve shape have been chosen, it is also within the scope of the invention to choose other control cams, for instance stepped cams, each step a different curve characteristic. In such a construction, the different regulating devices may normally be adjusted by a rotation of the control cam, whereas the automatic additional or corrective adjustment is obtained by passing from one to the next cam step, for instance, by axially displacing the cam.

We claim:

1. In a regulating device for internal combustion engines, particularly aircraft power plants, the combination of means for controlling the operation of the engine; a reciprocating member to actuate said controlling means; a cam mounted for both rotatory and axial movements; a reciprocatory follower bearing upon said cam and adapted to reciprocate said reciprocating member, the surface of the cam having such configuration that the follower is reciprocated by either the rotatary movement or the axial movement of the cam; manually operated means for imparting axial movement to the cam; and a barometric device for imparting rotatory movement to the cam.

2. In a regulating device for internal combustion engines, particularly aircraft power plants, the combination of a plurality of means for controlling the operation of the engine; a plurality of reciprocating members to actuate said controlling means, respectively; a plurality of co-axial cams mounted for unitary movement, rotatively about their common axis and axially thereof; a plurality of reciprocatory followers bearing upon said cams, respectively, and adapted to reciprocate said reciprocating members, respectively, the surfaces of said cams having such configurations that the followers are reciprocated by either the rotative movement or the axial movement of said cams; manually operated means for imparting one of said movements to the cams; and a barometric device for imparting the other of said movements to the cams.

3. In a regulating device for internal combustion engines, particularly aircraft power plants, the combination of a plurality of means for controlling the operation of the engine; a plurality of reciprocating members to actuate said controlling means, respectively; a plurality of co-axial cams mounted for unitary movement, rotatively about their common axis and axially thereof; a plurality of reciprocatory followers bearing upon said cams, respectively, and adapted to reciprocate said reciprocating members, respectively, the surfaces of said cams having such configurations that the followers are reciprocated by either the rotative movement or the axial movement of said cams; manually operated means for imparting rotative movement to the cams; and a barometric device for imparting axial movement to the cams.

4. In a regulating device for internal combustion engines, particularly aircraft power plants, the combination of a plurality of means for controlling the operation of the engine; a plurality of reciprocating members to actuate said controlling means, respectively; a plurality of co-axial cams mounted for unitary movement, rotatively about their common axis and axially thereof; a plurality of reciprocatory followers bearing upon said cams, respectively, and adapted to reciprocate said reciprocating members, respectively, the surfaces of said cams having such configurations that the followers are reciprocated by either the rotative movement or the axial movement of said cams; manually operated means for imparting axial movement to the cams; and a barometric device for imparting rotative movement to the cams.

5. In a regulating device for internal combustion engines, particularly aircraft power plants, the combination of a plurality of means for controlling the operation of the engine; a plurality of reciprocating members to actuate said controlling means, respectively; a rotatable shaft; a plurality of interconnected cams keyed on said shaft and axially slidable thereof; a plurality of reciprocatory followers bearing upon said cams, respectively, and adapted to reciprocate said reciprocating members, respectively, the surfaces of said cams having such configurations that the followers are reciprocated by either the rotative movement or the axial movement of said cams, manually operated means for imparting unitary movement to said cams axially of said shaft; and a barometric device for rotating said shaft to impart unitary rotative movement to said cams.

6. In a regulating device for internal combustion engines, particularly aircraft power plants, the combination of a plurality of means for controlling the operation of the engine; a plurality of reciprocating members to actuate said controlling means, respectively; a rotatable, axially movable shaft; a plurality of cams fixed upon said shaft; a plurality of reciprocatory followers bearing upon said cams, respectively, and adapted to reciprocate said reciprocating members, respectively, the surfaces of said cams having such configurations that the followers are reciprocated by either the rotative movement or the axial movement of said cams; manually operated means for rotating said shaft; and a barometric device for moving said shaft axially.

7. In a regulating device for internal combustion engines, particularly aircraft power plants, the combination of a plurality of means for controlling the operation of the engine; a plurality of reciprocating members to actuate said controlling means, respectively; a rotatable shaft; a plurality of cams fixed on said shaft; a second rotatable shaft; a plurality of interconnected cams keyed on said second shaft for movement axially thereof; a plurality of reciprocatory followers, bearing upon all of said cams, respectively, and adapted to reciprocate said reciprocating members, respectively, the cams fixed on the first shaft having surfaces of such configurations that their followers are reciprocated when the said cams are rotated, and the cams keyed on the second shaft having surfaces of such configuration that their followers are reciprocated when the said cams are either rotated or moved axially; a rocking lever; means actuated by the rocking of said lever for rotating the first shaft, and moving the cams on the second shaft axially; manually operated means for rocking said lever; and a barometric device for rotating said second shaft.

8. In a regulating device for internal combustion engines, for aircraft, the combination with a variable-pitch propeller of a plurality of means for controlling the operation of the engine, comprising a throttle for a supercharger of the engine, a fuel injection pump, an ignition distributor, and a speed-responsive governor for controlling the propeller-pitch; reciprocating members to regulate said controlling means, respectively; a rotatable shaft; a pair of cams fixed on said shaft; followers bearing on said cams, respectively, and adapted to reciprocate, respectively, the reciprocating members regulating the speed governor and the ignition distributor; a second rotatable shaft; a pair of interconnected cams keyed on said second shaft for unitary movement axially thereof; followers bearing on said second pair of cams, respectively, and adapted to reciprocate, respectively, the reciprocating members regulating the throttle and the fuel injection pump, the second pair of cams having surfaces of such configurations that their followers are actuated when the said cams are either rotated or moved axially; manually operated means to rotate the first shaft and move the cams keyed on the second shaft axially thereof; and a barometric device to rotate the second shaft.

ALBERT STIEGLITZ.
BERTHOLD GÄRTNER.